Oct. 1, 1957 — R. O. WALES — 2,808,208
COUNTER
Filed Nov. 23, 1956 — 2 Sheets-Sheet 1
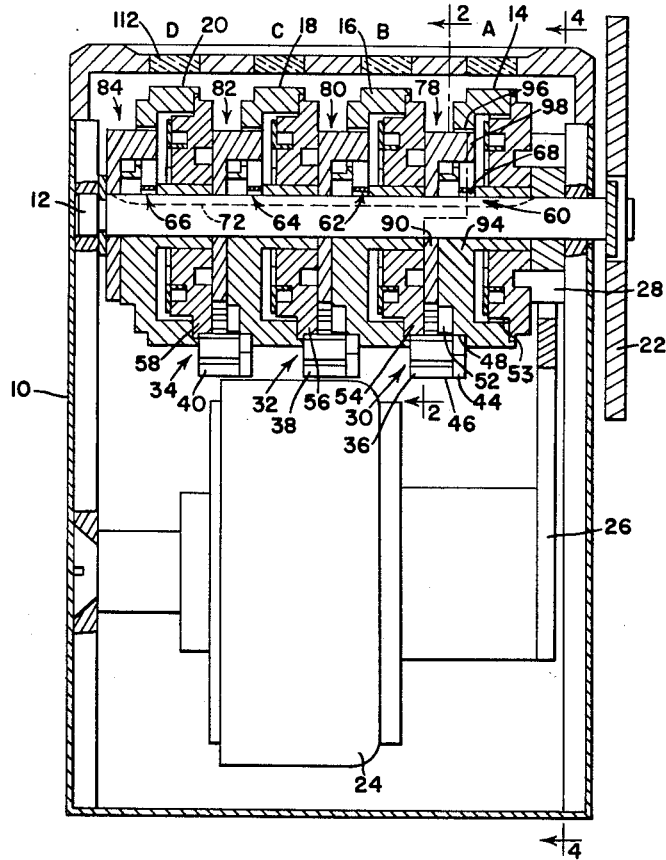
FIG. 1
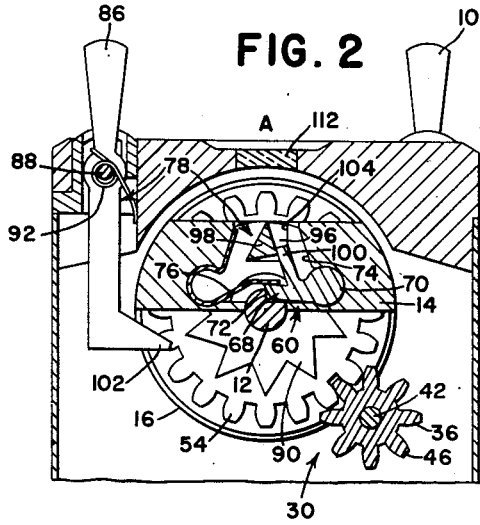
FIG. 2
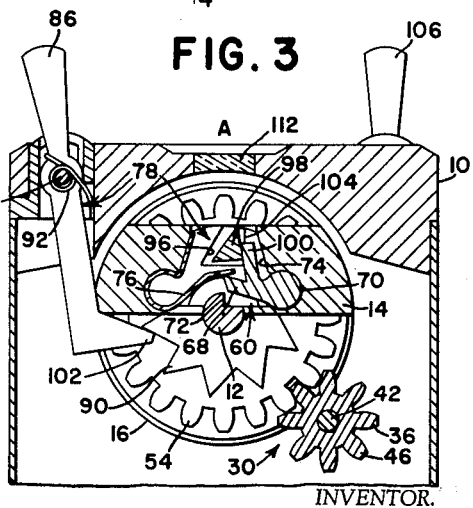
FIG. 3
INVENTOR.
R. O. WALES
BY
ATTORNEY Oct. 1, 1957 R. O. WALES 2,808,208
COUNTER
Filed Nov. 23, 1956 2 Sheets-Sheet 2
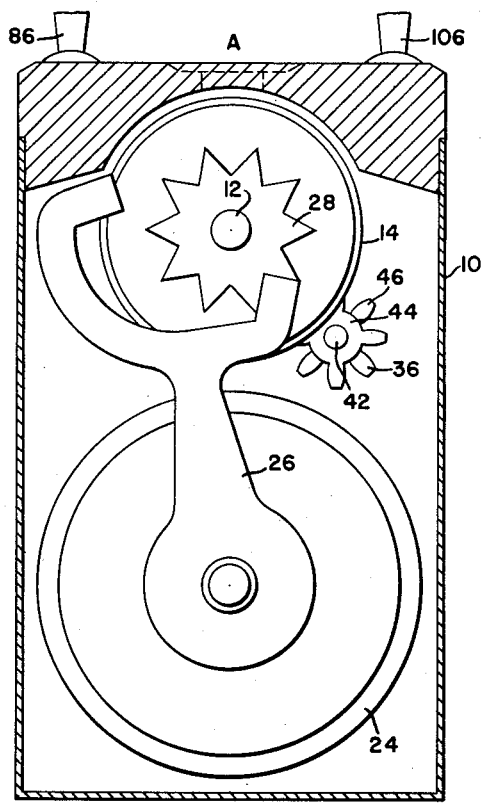
FIG. 4
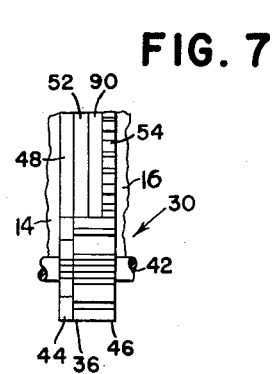
FIG. 7
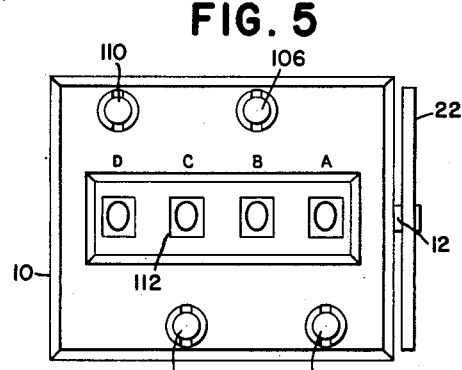
FIG. 5
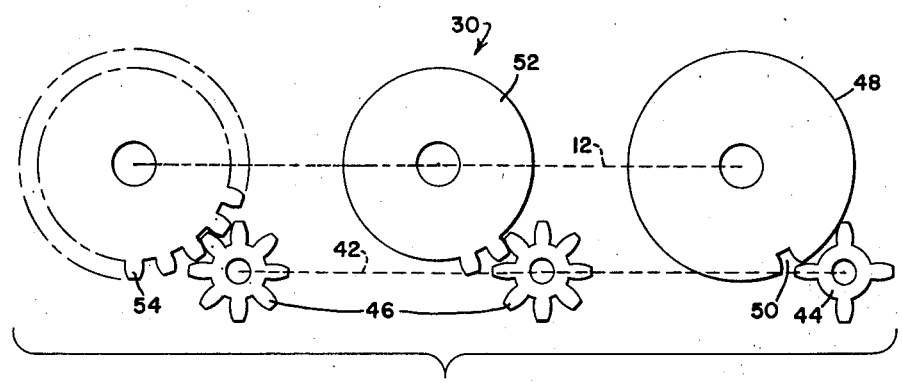
FIG. 6
INVENTOR.
R. O. WALES
BY
ATTORNEY

United States Patent Office 2,808,208
Patented Oct. 1, 1957

2,808,208

COUNTER

Roger O. Wales, Bettendorf, Iowa, assignor to Mast Development Co., Davenport, Iowa, a corporation of Iowa Application November 23, 1956, Serial No. 623,981

16 Claims. (Cl. 235—144)

This invention relates to a counter and more particularly to an improved counter featuring means whereby the counter wheels may be preset to any selected number.

In the ordinary counter employing several counter wheels or equivalent members, resetting is customarily available by means of a resetting shaft which is operative to return all wheels ultimately to zero (assuming here as elsewhere herein that the indicia dealt with are numerals, since counters are classically based on numerals). However, no known means has heretofore been provided to enable presetting, unless by a method involving partial disassembly of the mechanism and presetting the wheels individually. Accordingly, it is a significant object of this invention to provide a counter featuring presetting mechanism of simple and novel design. Another object is to afford a presetting means that can be incorporated into certain counters of existing types with but relatively small modification. It is an object to provide the presetting mechanism to operate to interrupt the normal resetting phase of the counter by selectively withdrawing or isolating wheels from the resetting rotation at any number including zero, whereby the counter may begin operation from a selected number rather than from zero. The presetting mechanism has means for retaining the preset position of the wheel against initial inadvertent overrun. It is a feature of the invention to incorporate the presetting means in a compact unitary organization, and preferably to house it at least in part respectively within recesses in the several wheels. A specific feature is to combine the presetting mechanism with the overrunning or one-way drive customarily found in the resetting means of conventional counter.

The foregoing and other important objects and desirable features inherent in and encompassed by the invention will become apparent as a preferred embodiment of the invention is disclosed in detail in the ensuing specification and accompanying drawings, the several figures of which are described below.

In the description and claims, expressions such as "front," "rear," "advance" etc. are relative only; for example, the counter wheels, referred to as advancing for additive operation, may also operate as subtractive wheels.

Figure 1 is a section of a counter embodying the invention, the section line paralleling the axis of the counter wheels.

Figure 2 is a transverse section as seen on the line 2—2 of Figure 1.

Figure 3 is a similar view but showing a different phase of operation of the presetting mechanism.

Figure 4 is a section on the line 4—4 of Figure 1.

Figure 5 is a reduced plan of the counter.

Figure 6 is a combined view illustrating the transfer mechanism between one wheel and its neighbor.

Figure 7 is a fragmentary view further illustrating the transfer mechanism.

The counter chosen for the purposes of illustration is a four-wheel type having a support or casing 10 carrying a shaft member 12 on which four counter wheel members 14, 16, 18 and 20 are journaled respectively in the typical A, B, C and D position, the wheels being respectively a digits wheel, a tens wheel, a hundreds wheel and a thousands wheel. The number of wheels is not a limitation but the illustrated plurality demonstrates the utility and practicability of the design in a multiple-wheel counter.

As already indicated, expressions such as "wheels," "numbers" etc. are used in terms of convenience and not of limitation, primarily in the interests of clarity and to orient the novelty for those familiar with the wheel and number types of counters.

The shaft 12, while journaled in the casing 10, does not rotate with the wheels during the counting operation, but does turn or advance angularly during reset and preset, for which a hand wheel 22 is provided as means for accomplishing this selected advance. During counting, the counter wheels rotate or advance in the direction of the arcuate arrows indicated on the drawings and in a normal full operation advance from 0000 to 9999 (or from 9999 to 0000 where the counter is subtractive) by input means 24 which may be a conventional rotary solenoid intermittently energized and deenergized for driving a double-throw yoke 26 to advace the digits wheel 14 in angular increments via a ten-tooth star wheel 28 drivingly connected in any suitable manner to said digits wheel; that is to say, each stroke of the yoke advances the digits wheel one number and its return stroke advances the digits wheel another number until the digits wheel reaches 9, at which point transfer mechanism 30 between the digits and tens wheels advances the tens wheel to 1 as the digits wheel attains 0. This transfer mechanism may be of any acceptable type, one conventional form of which is shown here, Figures 5 and 6 illustrating the principles which apply to not only the A—B transfer at 30 but also to a B—C transfer at 32 and a C—D transfer at 34. Since these mechanisms are alike and exist between each counter wheel and its neighbor, with the exception that no transfer mechanism follows the thousands wheel in the present case, only the mechanism 30 will be described with any particularity and then only to complete the disclosure of a basic type of counter.

As previously outlined, the counter wheels are independently journaled on the shaft 12 and may thus be considered of course as being journaled by the casing or support 10 coaxially with each other and with the shaft. Hence, with the counter starting at 0000, the digits wheel 14 turns alone until it effects a transfer via 30 to the tens wheel 16 which ultimately advances to 9 and then transfers to the hundreds wheel 18 via 32 and so on. The transfer mechanisms cooperate respectively with a plurality of pinion sets 36, 38 and 40 respectively for the A—B, B—C and C—D transfers. These pinion sets are independently journaled coaxially in the casing by means of a fixed jack shaft 42, the mounting details of which are not important here. Since the pinion set operates in conjunction with the A—B transfer at 28 and since only that transfer mechanism will be described in detail, the others will be only briefly adverted to, it being understood that for all practical purposes they are all identical.

The pinion set 36 comprises a well known four-eight pinion, having a relatively narrow four-tooth pinion part 44 and a relatively wider eight-tooth pinion part 46, usually formed of one piece or otherwise rotatable in unison. The digits wheel 14 carries coaxially fixed thereto a locking disc 48 having a single notch 50 therein capacitated to receive a tooth on the four-tooth pinion part 44 at the 9–0 position of the digits wheel. In other positions, the circular periphery of the disc bridges two adjacent teeth of the four-tooth part and prevents turning thereof while the disc turns with the digits wheel 14. Also keyed or otherwise coaxially fixed to the digits wheel, as by being integral with or secured to the locking disc 48, is a two-tooth driven gear 52 which, except for its two teeth, is annularly cut back to the root circle as is conventional. The two teeth on the gear 52 are registered with the notch 50 in the disc, so that when the digits wheel attains its 9 position the next angular increment thereof will simultaneously release the lock on the pinion part 44 as the notch 50 receives the adjacent tooth on the four-tooth part 44 and the teeth on the gear 52 will engage the eight-tooth part 46 of the pinion set 36 and will advance the pinion set by two teeth (counterclockwise as seen in Figures 2, 3 and 4). In other words, the disc 48 and driven gear 52 occupy parallel radial planes corresponding respectively to the four-tooth pinion part 44 and an axial half, more or less, of the wider eight-tooth pinion part 46.

A twenty-tooth gear 54 is positioned coaxially alongside the tens wheel 16 and is in constant mesh with the remainder of the eight-tooth pinion part 46. The gear 54 and wheel 16 are conventionally detented together by any well-known one-way drive means, such as the peripheral type designated generally at 53, so that during counting and transferring the gear and wheel turn together but during reset the wheel is advanceable relative to the gear since the gear is locked by the transfer mechanism. Hence, when the pinion set 36 is advanced by the two teeth on the digits wheel gear 52 as the digits wheel advances from 9 to 0, the tens wheel is advanced one increment, as from 0 to 1. At that point, the locking disc again locks the pinion set 36 and the digits wheel must make another revolution before the pinion set repeats its performance, this time again advancing the tens wheel another increment, as from 1 to 2 and so on to 0. The next pinion set 38 is similar in construction in operation so that when the tens and digits wheels read 99, the pinion set 38 will effect an angular incremental advance of the hundreds wheel, as from 0 to 1, etc., via a coaxial twenty-tooth gear 56 detented as above to said hundreds wheel; and when the digits, tens and hundreds wheel read 999, the last pinion set 40 will operate to advance the thousands wheel, via a coaxial twenty-tooth gear 58 detented thereto, to 9999 (or, in a subtractive counter, to 1111) and on to 0000. In short, one revolution of the digits wheel advances the pinion set 36 by two teeth and the pinion set advances the tens wheel gear 54 by one-tenth of a revolution and so on.

As already described, the shaft 12 is stationary as the counter wheels turn during the counting phase and is turned clockwise by the hand wheel 22 for resetting the wheels to zero. When turned counterclockwise, the shaft merely free wheels, as will appear below. At this point it should be observed that the hand wheel is merely typical of any of several means that could be employed for advancing the shaft 12. The ability of the shaft to turn at times in the same direction as the counter wheels is availed of for reset purposes, and to this end the relationship between the shaft 12 and the counter wheels 14, 16, 18 and 20 involves four one-way drive means 60, 62, 64 and 66, respectively. Since these may all be identical, only the means 60 between the shaft 12 and the counter wheel 14 will be covered in detail in this description. In brief, each means 60, 62, 64 and 66 enables its respective counter wheel to advance angularly relative to the shaft 12 during counting but enables the shaft to drive the wheels during resetting.

The means 60, as representative of the others also, includes a pair of drive elements, one of which consists of a pawl element 68 pivoted at 70 to the digits wheel 14 and the other of which comprises a lug 72 formed on the shaft 12 by a way or groove milled or otherwise cut lengthwise into the shaft. The digits wheel has an internal recess 74 in which the associated elements 68 and 72 are housed, and a strip spring 76 serves as biasing means for biasing the pawl element 68 toward engagement with the lug or groove element 72 in the shaft. Since, as stated above, normal rotation of the digits wheel is clockwise, the pawl can overrun the lug during counting. It will be clear of course that as the digits wheel advances as described, the pawl will proceed angularly with the wheel and will thus assume different angular positions relative to the lug according to the angular position of the digits wheel. Hence, the pawl and lug elements of the tens, hundreds and thousands wheels will be angularly separated according to the respective angular positions of those wheels, and when the shaft 12 is turned by the hand wheel 22 for resetting, the lugs will pick up the respective pawls and return all counter wheels to 0000. That is, the lugs engage the pawls simultaneously at 9999 to advance the counter wheels at once to 0000 and, if the wheels are not at a common position, the shaft must advance relative to the wheels until the lugs pick up the respective pawls. For example, if the counter wheels read 1234, the pawls of the wheels will be respectively one, two, three and four increments past the lug groove 72, and when the shaft 12 is turned it will pick up the counter wheels in that order until all four wheels are turned in unison to 0000.

The foregoing outlines the counting and resetting functions of the counter. The following will pertain to the presetting mechanism, which enables the counter wheels to be preset by the shaft 12 at any selected reading so that the counter will start from that reading rather than from 0000. For this purpose, the counter is equipped with a plurality of individual, casing mounted control means 78, 80, 82 and 84 for the wheels 14, 16, 18 and 20, respectively. Since these means are or may be all identical, it is necessary to describe only the means 78 for the counter wheel 14 in detail, it being understood that the other means have similar components.

The means 78 comprises an actuator or shiftable part in the form of a lever 86 pivoted at 88 on the casing 10 and a device in the form of a ten-tooth star wheel 90 coaxial with the shaft 12 and counterwheel 14. The lever is spring-loaded at 92 to a first position clear of or out of engagement with the star wheel 90, and the star wheel is loose on the shaft 12 and is turnable within limits about its axis relative to the counter wheel 14, lying next adjacent to the proximate radial wall 94 of the counter wheel, which face closes the recess 74 at that side except for an aperture 96 therein through which a tang or element shifter 98 on the star wheel 90 projects for engagement with a finger 100 preferably formed integral with the shiftable pawl element 68 of the one-way drive means 60. In the construction illustrated, the pawl element is a bifurcated member having two fingers, one of which establishes the drive pawl 68 and the other of which provides the lift finger 100.

Since the tang 98 on the presetting star wheel 90 extends through the aperture 96 in the digits wheel wall 94, it follows that the star wheel will turn generally with the digits wheel; hence the ten teeth on the star wheel, one for each angular or number position of the digits wheel. However, the aperture 96 has sufficient angular length to enable limited turning or rocking of the star wheel relative to the digits wheel, as will appear below.

The lower portion of the actuator lever 86 has a cam foot 102 which is selectively engageable with whichever of the ten teeth on the start wheel 90 that corresponds to the particular number position of the digits wheel, and is thus operative to advance the star wheel 90 through the limited angular extent permitted by the length of the aperture 96, in which respect it should be observed that each tooth on the star wheel is itself in effect a cooperative cam. Thus, as the lever 86 is rocked from its first position (Figure 2) to its second position (Figure 3), the foot 102 engages under the proximate star wheel tooth and advances the star wheel one increment. As the star wheel turns, its tang or element shifter 98 engages the pawl finger 100 and lifts the pawl 68 about its pivot 70 to a position clear of engageability with the shaft lug groove or way 72. As long as the actuator lever 86 is held in its second position (Figure 3), the shaft 12 may be rotated without effect on the counter wheel 14, since the control means, when thus actuated, in effect deactivates the one-way drive means 60. The angular extent of the aperture 96 in the radial wall 94 of the digits wheel 14 is sufficient to enable angular travel of the tang or element shifter 98 in the amount described and this aperture may be so designed that, when the tang reaches the end of its angular travel, which is sufficient to lift pawl element 68 via the finger 100, the tang engages a portion 104 of the radial wall 94 that defines the right-hand or clockwise edge of that aperture, whereby retrograde movement of the digits wheel is prevented. Likewise, the foot 102, remaining in engagement behind the star wheel tooth cammed clockwise by that foot also prevents retrogression. Of further importance in this respect is that the action if the control means 78 in advancing the star wheel or device 90 to deactivate the one-way drive means 60 does not advance or otherwise disturb the instant position of the digits wheel. Thus, the control means may be combined or in effect incorporated with the one-way drive means to achieve the novel presetting effect without detracting from the normal counting and reset functions of the counter.

As best seen in Figure 5 the actuator lever 86 for the control means 60 is conveniently grouped with actuator levers 106, 108 and 110 respectively for the other control means 62, 64 and 66, and these levers are staggered on the casing at opposite sides of and along a viewing window 112 so as to facilitate manipulation thereof. All actuator levers are individually biased to their respective first positions, the biasing means for the lever 86 having been described as comprising the spring 92, which is representative of the biasing means for the other levers 106, 108 and 110. Thus, the levers may be individually or combinatively manipulated to withdraw the wheels 14, 16 and 18 and/or 20 selectively from the effects of the shaft 12 by deactivating the respective one-way drive means 60, 62, 64 and/or 66. Is should be understood that the actuator levers need not be held in their second positions once the associated pawls are lifted and the shaft 12 turned enough so that the lug groove 72 cannot receive the pawls upon release of the actuators.

Operation

The counting and resetting operations have been covered above and need not be repeated. Hence, the present description will deal with the presetting phase.

Let it first be assumed that all counter wheels are at zero and that the counter reading is therefore 0000, in which case all drive pawls, as at 68, will be simultaneously engaged with the shaft lug groove 72; or, in other words, all one-way drive means 60, 62, 64 and 66 will be activated to advance all counter wheels clockwise upon clockwise turning of the shaft 12 by the hand wheel 22. In the circumstance the shaft 12 is capacitated to advance all counter wheels to 1111, 2222, 3333, etc. Now, suppose, for example, that it is desired to preset the counter at 2345. The shaft 12 may be turned until the counter reads 2222, at which point the actuator lever 110 for the thousands wheel 20 is rocked to deactivate the one-way drive means 66 for that wheel, thus withdrawing that wheel from further rotation with the shaft 12. Turning of the shaft is continued until the next three wheels read 333, in which case the entire reading is 2333. Now the next actuator lever 108 for hundreds wheel 18 is rocked to deactivate the one-way drive means 64, and the hundreds wheel is withdrawn from the effects of the shaft 12. Continued turning of the shaft is effected until the tens and digits wheels read 44, or the entire reading is 2344, at which time the actuator lever 106 is rocked to deactivate the one-way drive means 62 and the tens wheel is withdrawn from the operation, leaving engaged only the one-way drive means 60 for the digits wheel. Then, the last increment of turning of the shaft 12 will carry the digits wheel to its 2 position and the desired reading 2345 will have been achieved.

As will be seen, any desired preset reading can be attained by turning the shaft 12 and by selectively withdrawing the wheels 14, 16, 18 and 20 from the effects of the shaft as required. Hence, a presetting function is simply and economically incorporated into a counter of otherwise conventional design. The recessing of the drive means 60, 62, 64 and 66, the flat design of the star wheel device 90 and the comparable devices for the other control means 80, 82 and 84, contribute to the compactness of the organization without material addition to the overall length of the counter and without undue complication of the mechanism. The ability of the presetting mechanism to achieve preset without undesirable advance or retrogression of the counter wheels during the performance of the presetting operation is also significant, as are those other features enumerated in detail herein.

In presetting of additive 4-digit counters, the preset operation is effected between 0000 and 9999 and in a similar but subtractive counter is achieved between 9999 and 0000, thus preventing transfer among the wheels.

Features and advantages other than those set forth, as well as structural and functional modifications and alterations in the preferred construction and design disclosed, will readily occur to those skilled in the art, all of which may be exploited without departure from the spirit and scope of the invention.

What is claimed is:

1. A counter, comprising: a support; a shaft member journaled in said support; a counter wheel member journaled coaxially with the shaft member; input means for angularly advancing said wheel member relative to the shaft member; means for selectively holding or angularly advancing said shaft member; one-way drive means including cooperative elements respectively on said members, one of said elements being shiftably carried by its member so as to overrun the other element upon angular advance of the wheel member relative to the shaft member but inter-engageable with said other element upon angular advance of the shaft member whereby the shaft member is capacitated to advance the wheel member; and control means on the support and selectively movable between a first position disengaged from said shiftable element and a second position engaging and shifting said shiftable element clear of engageability with the other element so as to capacitate the shaft member for advance relative to the wheel member.

2. The invention defined in claim 1, including: means operative upon movement of the control means to its second position for restraining the wheel member against angular movement in at least one direction.

3. The invention defined in claim 1, in which: said control means includes a device coaxial with the shaft and wheel members and engageable with and operative to shift said shiftable element as aforesaid in the second position of said control means.

4. The invention defined in claim 1, in which: the wheel member has a recess at one radial face thereof; the drive means elements are disposed at least in part in said recess; and the control means includes a device coaxial with said members and extending into said recess to engage and shift the shiftable element in the second position of said control means.

5. The invention defined in claim 1, in which: the wheel member bears indicia uniformly angularly spaced thereabout; and the control means includes a toothed wheel coaxially journaled relative to the shaft and wheel members and having teeth thereon equal in number and angular spacing to the indicia on the wheel member, an element shifter carried by the toothed wheel respectively clear of and engageable with the shiftable element respectively in the first and second positions of the control means, and a selectively shiftable part on the support engageable with the tooth of the toothed wheel that corresponds to the angular position of the wheel member on the shaft member for turning said toothed wheel to cause the element shifter to shift said shiftable element clear of the other element.

6. The invention defined in claim 5, in which: the wheel member has an internal recess and a radial wall over said recess, said elements being housed at least in part in said recess; said toothed wheel is external to said recess to one side of said wall; said wall has an aperture therein, and said element shifter on the toothed wheel extends axially loosely through said aperture for cooperation with said shiftable element.

7. The invention defined in claim 6, in which: said aperture is of sufficient angular extent to enable angular movement of the element shifter, upon turning of the toothed wheel, an amount required to shift said shiftable element, and said radial wall has a stop portion defining one edge of said aperture and against which the element shifter abuts in the second position of said control means to lock the wheel member against at least retrograde turning.

8. The invention defined in claim 1, in which: the wheel member has a recess therein substantially surrounding said elements and said wheel member further has a radial wall closing said recess from one side, said wall having an aperture therethrough for access to the shiftable element; and said control means includes a device coaxially journaled relative to the shaft and wheel members externally to said recess and including an element shifter extending loosely axially through said aperture for cooperation with the shiftable element.

9. The invention defined in claim 1, in which: the wheel member has indicia uniformly angularly spaced apart thereon; and the control means includes an angularly movable part journaled coaxially with the shaft and wheel members and having thereon a plurality of cam portions equal in number and spacing to the wheel member indicia, an actuator operative in the second position of the control means to engage the cam portion corresponding to the angular position of the wheel member on the shaft member for camming said movable part angularly, and an element shifter on the movable part engaging and shifting the shiftable element upon such camming of said movable part.

10. The invention defined in claim 9, in which the element shifter upon camming of said movable part engages the wheel member to hold said wheel member against angular movement in one direction while the actuator retains engagement with said movable part.

11. The invention defined in claim 10, in which: said element shifter and actuator are so constructed and arranged to shift the shiftable element and to hold the wheel member as aforesaid without disturbing the instant angular position of said wheel member.

12. The invention defined in claim 1, in which: the wheel member has a recess therein housing at least in part said one-way drive elements, said shiftable element is carried by the wheel member and the other element is on the shaft member, said shiftable element includes a first portion engageable with and disengageable from the other element and a second portion engageable by the control means to incur shifting of said shiftable element when the control means is moved to its second position, and means at least in part within said recess and biasing said shiftable element toward engagement with the other element.

13. The invention defined in claim 1, in which: the shiftable element is carried by the wheel member and the other element is carried by the shaft member, and said shiftable element is bifurcated to afford a first finger engageable with and disengageable from the other element and a second finger engaged by the control means upon movement of said control means to its second position.

14. The invention defined in claim 1, including: a plurality of additional wheel members independent of each other and of the first-mentioned wheel member and coaxially journaled relative to said first-mentioned wheel member, each of said additional wheel members having one-way drive means including elements similar to the elements of the first-mentioned drive means, all of said wheels being arranged in side-by-side relationship; a plurality of transfer mechanisms, one between each wheel member and its neighbor; and a plurality of additional control means on the support respectively selectively individually operative on the shiftable elements of the additional wheel members in the same fashion as the first-mentioned control means.

15. A counter, comprising: a support; a shaft member journaled in said support; a counter wheel member journaled coaxially with the shaft member; input means for angularly advancing said wheel member relative to the shaft member; means for selectively holding or angularly advancing said shaft member; one-way drive means normally activated to enable the wheel member to advance relative to the shaft member but to connect the two members for advance in unison upon advance of the shaft member; and control means on the support and selectively movable between an idle position to an operating position deactivating the one-way drive means so as to capacitate the shaft member for advance relative to the wheel member.

16. A counter, comprising: a support; a shaft journaled on the support; a plurality of counter wheels journaled on the shaft; input means for driving the counter wheels in advance directions to perform the counting operation; a plurality of one-way drive means respectively between the shaft and the wheels enabling the wheels to overrun the shaft during the counting operation but enabling the shaft to drive the wheels for resetting the wheels to their respective starting positions; and presetting mechanism including a plurality of control means for selectively deactivating the one-way drive means to withdraw the counter wheels selectively from the effects of the shaft during resetting of said wheels.

No references cited.